US011898952B2

(12) United States Patent
Kato

(10) Patent No.: US 11,898,952 B2
(45) Date of Patent: Feb. 13, 2024

(54) MICROPARTICLE MEASURING APPARATUS AND MICROPARTICLE MEASURING METHOD

(71) Applicant: SONY CORPORATION, Tokyo (JP)

(72) Inventor: Yasunobu Kato, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/276,529

(22) PCT Filed: Aug. 9, 2019

(86) PCT No.: PCT/JP2019/031727
§ 371 (c)(1),
(2) Date: Mar. 16, 2021

(87) PCT Pub. No.: WO2020/066346
PCT Pub. Date: Apr. 2, 2020

(65) Prior Publication Data
US 2022/0034784 A1 Feb. 3, 2022

(30) Foreign Application Priority Data

Sep. 27, 2018 (JP) ................. 2018-182569

(51) Int. Cl.
*G01N 15/14* (2006.01)
(52) U.S. Cl.
CPC ..... *G01N 15/1434* (2013.01); *G01N 15/1404* (2013.01); *G01N 2015/149* (2013.01)
(58) Field of Classification Search
None
See application file for complete search history.

(56) References Cited

U.S. PATENT DOCUMENTS

| 4,573,796 | A | | 3/1986 | Martin et al. |
| 4,849,282 | A | | 7/1989 | Watanabe et al. |
| 5,410,401 | A | * | 4/1995 | Shofner ............... G01N 33/362 |
| | | | | 73/160 |

(Continued)

FOREIGN PATENT DOCUMENTS

| CA | 1222394 A | 6/1987 |
| CN | 104096687 A | 10/2014 |

(Continued)

OTHER PUBLICATIONS

International Search Report and Written Opinion of PCT Application No. PCT/JP2019/031727, dated Oct. 29, 2019, 10 pages of ISRWO.

*Primary Examiner* — Rufus L Phillips
(74) *Attorney, Agent, or Firm* — CHIP LAW GROUP

(57) ABSTRACT

Provided is a microparticle measuring apparatus including a plurality of light detection sections that detects, at different positions, optical information emitted from microparticles flowing through a flow channel. The microparticle measuring apparatus further includes a detection timing control section that controls a detection timing of each light detection section, on the basis of a trigger signal detected at a first reference channel provided in a first light detection section, and an optical signal detected at a second reference channel provided in a second light detection section that detects optical information emitted from the microparticles, at a position different from a position of the first light detection section.

17 Claims, 9 Drawing Sheets

(56) References Cited

U.S. PATENT DOCUMENTS

| | | | |
|---|---|---|---|
| 5,880,474 A * | 3/1999 | Norton | G01N 15/1459 |
| | | | 250/458.1 |
| 2008/0319680 A1* | 12/2008 | Fox | H04B 17/0082 |
| | | | 356/338 |
| 2012/0277902 A1* | 11/2012 | Sharpe | B07C 5/3425 |
| | | | 209/132 |
| 2013/0177973 A1 | 7/2013 | Kondo | |
| 2014/0212917 A1* | 7/2014 | Durack | G01N 15/1404 |
| | | | 250/459.1 |
| 2014/0299522 A1 | 10/2014 | Ito | |
| 2014/0374630 A1 | 12/2014 | Saiyed et al. | |
| 2017/0074776 A1* | 3/2017 | Fox | G01N 15/147 |
| 2018/0156711 A1 | 6/2018 | Vrane | |
| 2018/0298324 A1 | 10/2018 | Takeda et al. | |

FOREIGN PATENT DOCUMENTS

| | | | | |
|---|---|---|---|---|
| CN | 107532990 A | | 1/2018 | |
| DE | 3500247 A1 | | 7/1985 | |
| EP | 2810063 A1 | | 12/2014 | |
| FR | 2557977 A | | 7/1985 | |
| JP | 60-209147 A | | 10/1985 | |
| JP | 2010-286341 A | | 12/2010 | |
| JP | 2013-15357 A | | 1/2013 | |
| JP | 2014-202573 A | | 10/2014 | |
| JP | 2015-512615 A | | 4/2015 | |
| KR | 10-2014-0124388 A | | 10/2014 | |
| WO | WO-2010095391 A1 * | | 8/2010 | B01L 3/0268 |
| WO | 2013/114333 A1 | | 8/2013 | |
| WO | 2016/182034 A1 | | 11/2016 | |
| WO | 2018/094301 A1 | | 5/2018 | |

* cited by examiner

MICROPARTICLE MEASURING APPARATUS AND MICROPARTICLE MEASURING METHOD

CROSS REFERENCE TO RELATED APPLICATIONS

This application is a U.S. National Phase of International Patent Application No. PCT/JP2019/031727 filed on Aug. 9, 2019, which claims priority benefit of Japanese Patent Application No. JP 2018-182569 filed in the Japan Patent Office on Sep. 27, 2018. Each of the above-referenced applications is hereby incorporated herein by reference in its entirety.

TECHNICAL FIELD

The present technology relates to a microparticle measuring apparatus. More specifically, the present technology relates to a microparticle measuring apparatus and a microparticle measuring method for detecting optical information from microparticles circulating through a flow channel.

BACKGROUND ART

In recent years, with progress of an analysis technique, developments are being made for a technique for measuring biological microparticles such as cells and microorganisms, microparticles such as microbeads, or the like individually, analyzing the measured microparticles, and sorting the analyzed microparticles in a process of driving the microparticles to flow through a flow channel.

As a typical example of such a technique for analyzing or sorting microparticles, the technological improvement of an analysis technique called flow-site-metry is progressing rapidly. The flow-site-metry is an analysis technique for analyzing and sorting microparticles serving as the subject of an analysis, by driving the microparticles into a fluid in an aligned state, and radiating laser light or the like to the microparticles to detect fluorescent or scattered light emitted from each microparticle.

In an analysis of microparticles, typified by flow-site-metry or the like, an optical technique for radiating light such as laser light to microparticles serving as the subject of an analysis and detecting fluorescent or scattered light emitted from the microparticles has been used in many cases. Then, on the basis of optical information detected, a histogram is extracted using a computer and software for an analysis, and an analysis is carried out.

An apparatus capable of a multicolor analysis using a plurality of coloring matters has been desired on the basis of the recent demands from the basic medical and clinical fields. However, in a case of a "single spot", that is, in a case of detecting a plurality of fluorochromes by detection of light from a single spot, analysis accuracy is lowered in some cases due to optical interference. In view of this, in the microparticle analysis fields, introduction of "multiple spots" capable of optical detection at a plurality of positions on a flow channel is progressing, and a technology capable of analyzing a larger number of coloring matters is under development.

For example, Patent Document 1 discloses an optical measurement apparatus including at least: a flow channel through which samples flow; first light radiation means for radiating light to the samples flowing through the flow channel; first light detection means for detecting optical information emitted from the samples due to the light radiated by the first light radiation means; first opto-electrical conversion means for converting the optical information detected by the first light detection means into an electrical signal; first analog-to-digital conversion means for carrying out an analog-to-digital conversion process on the electrical signal converted by the first opto-electrical conversion means; second light radiation means provided downstream of the first light radiation means and capable of radiating light to the samples; second light detection means capable of detecting optical information emitted from the samples due to the light radiated by the second light radiation means; second opto-electrical conversion means capable of converting the optical information detected by the second light detection means into an electrical signal; amplification means capable of amplifying the electrical signal converted by the second opto-electrical conversion means, on the basis of a digital signal output by the first analog-to-digital conversion means as a result of the analog-to-digital conversion process; and second analog-to-digital conversion means capable of carrying out an analog-to-digital conversion process on the electrical signal amplified by the amplification means.

CITATION LIST

Patent Document

Patent Document 1: Japanese Patent Application Laid-Open No. 2010-286341

SUMMARY OF THE INVENTION

Problems to be Solved by the Invention

In a multi-color analysis method using multiple spots, typically, detection timings among the respective spots are delayed by a time (a laser delay time) determined at a timing such as a timing immediately after startup of an apparatus or a timing immediately after replacement of a chip including a flow channel.

However, microparticles flow through a flow channel at a nonuniform flow rate. The flow rate of the microparticles varies depending on flowing positions on the flow channel, sizes of the microparticles, and the like. For example, it is known that the flow rate of the microparticles flowing near a center of the flow channel in sectional view is higher, whereas the flow rate of the microparticles flowing near a periphery of the flow channel in sectional view is lower. Furthermore, there is a fact that particles larger in size flow slower, whereas particles smaller in size flow faster.

For example, FIG. 12 is a conceptual diagram that illustrates a period in which a light detection process in a multi-color analysis method using multiple spots is carried out. In FIG. 12, "A" illustrates a light detection timing of a 2nd spot in a case where a flow rate of microparticles is fixed, "B" illustrates a light detection timing of the 2nd spot in a case where the flow rate of the microparticles is high, and "C" illustrates a light detection timing of the 2nd spot in a case where the flow rate of the microparticles is low. If the detection timings among the respective spots are controlled on the basis of a time (a laser delay time) determined at a timing such as a timing immediately after startup of an apparatus or a timing immediately after replacement of a chip including a flow channel, no problems arise in the case where the flow rate of the microparticles is fixed. However, in the case where the flow rate of the microparticles is high or low, there is a possibility that optical feature amounts detected at the 2nd spot become small.

If such a phenomenon occurs, in providing statistics on or graphing heights (H), areas (A), and widths (W) of voltage signals into which the optical signals detected at the 2nd spot are converted, the average value becomes small or the variance becomes large. Consequently, there may arise a problem that two or more groups of the microparticles that can be separated normally appear as one group of the microparticles in some cases.

Hence, a main object of the present technology is to provide a technology of maintaining light detection accuracy at a high level irrespective of individual variations in flow rate of microparticles flowing through a flow channel.

Solutions to Problems

That is, first, the present technology provides a microparticle measuring apparatus including:

a plurality of light detection sections configured to detect, at different positions, optical information emitted from microparticles flowing through a flow channel; and a detection timing control section configured to control a detection timing of each light detection section, on the basis of a trigger signal detected at a first reference channel provided in a first light detection section, and an optical signal detected at a second reference channel provided in a second light detection section that detects optical information emitted from the microparticles, at a position different from a position of the first light detection section.

In the microparticle measuring apparatus according to the present technology, the detection timing control section can control the detection timing of each light detection section in real time.

In the microparticle measuring apparatus according to the present technology, the detection timing control section can control a detection process period of the second light detection section.

In this case, the detection timing control section can detect a detection process period of the second light detection section.

In the microparticle measuring apparatus according to the present technology, the trigger signal detected at the first reference channel can be made optically equal to the optical signal detected at the second reference channel.

In this case, specifically, for example, a voltage signal into which the trigger signal detected at the first reference channel is converted can be made identical in height (H), area (A), and width (W) with a voltage signal into which the optical signal detected at the second reference channel is converted.

The microparticle measuring apparatus according to the present technology can include a flow-rate control section configured to control a flow rate of the microparticles on the basis of the trigger signal detected at the first reference channel and the optical signal detected at the second reference channel.

In the microparticle measuring apparatus according to the present technology, the flow-rate control section can control the flow rate of the microparticles such that the microparticles pass between the first light detection section and the second light detection section for a fixed time.

In the microparticle measuring apparatus according to the present technology, the flow-rate control section can control the flow rate of the microparticles by controlling a liquid sheath feeding pressure.

The microparticle measuring apparatus according to the present technology can include a sorting section configured to sort the microparticles on the basis of the optical information detected by the plurality of light detection sections.

The microparticle measuring apparatus according to the present technology can include a sorting timing control section configured to control a sorting timing of the sorting section, on the basis of the trigger signal detected at the first reference channel and the optical signal detected at the second reference channel.

In the microparticle measuring apparatus according to the present technology, the sorting timing control section can control the sorting timing of the sorting section in real time.

In the microparticle measuring apparatus according to the present technology, the first reference channel and the second reference channel can detect scattered light from the microparticles.

In this case, the scattered light can be one or more kinds of scattered light selected from frontward scattered light, sideward scattered light, and rearward scattered light.

The microparticle measuring apparatus according to the present technology can include a single third light detection section or a plurality of third light detection sections configured to detect optical information emitted from the microparticles, at a position or positions different from the positions of the first light detection section and second light detection section.

In the microparticle measuring apparatus according to the present technology, the detection timing control section can control a detection timing of each light detection section, on the basis of the trigger signal detected at the first reference channel, the optical signal detected at the second reference channel, and an optical signal detected at a third reference channel provided in the or each third light detection section.

In the microparticle measuring apparatus according to the present technology, the first light detection section can detect the optical information emitted from the microparticles, at a position upstream of the second light detection section.

On the contrary, the first light detection section can also detect the optical information emitted from the microparticles, at a position downstream of the second light detection section.

Next, the present technology provides a microparticle measuring method including:

a light detection step of detecting, at a plurality of positions, optical information emitted from microparticles flowing through a flow channel; and a detection timing control step of controlling, on the basis of a trigger signal detected at a first reference channel provided in a first light detection section and an optical signal detected at a second reference channel provided in a second light detection section that detects optical information emitted from the microparticles, at a position different from a position of the first light detection section, a detection timing of each light detection section.

The term "microparticles" in the present technology broadly involves biologically relevant microparticles such as cells, microorganisms, and liposomes, synthesis particles such as latex particles, gel particles, and industrial particles, and the like.

The biologically relevant microparticles include chromosomes, liposomes, mitochondria, organelles (organelles), and the like that make up various cells. The cells include animal cells (e.g., hemocyte cells) and plant cells. The microorganisms include bacteria such as *Escherichia coli*, viruses such as tobacco mosaic virus, fungi such as yeast, and the like. Moreover, the biologically relevant microparticles may also include biologically relevant macromolecules such as nucleic acids, proteins, and complexes thereof.

Furthermore, the industrial particles may be, for example, organic or inorganic polymer materials, metals, or the like. The organic polymer materials include polystyrene, styrene divinylbenzene, polymethyl methacrylate, and the like. The inorganic polymer materials include glass, silica, magnetic materials, and the like. The metals include colloidal gold, aluminum, and the like. In general, these microparticles typically have a spherical shape, but may have a non-spherical shape. Furthermore, the sizes, masses, and the like of these microparticles are not particularly limited.

MODE FOR CARRYING OUT THE INVENTION

Figure 1:
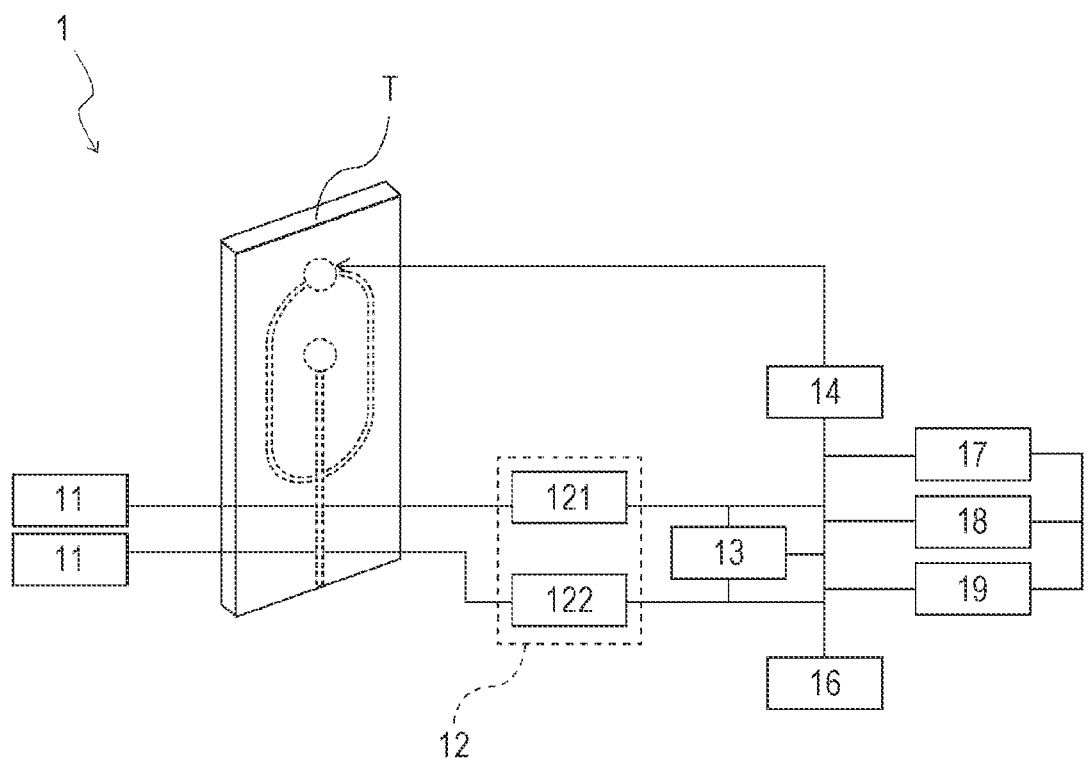
FIG. 1 is a schematic conceptual diagram schematically illustrating a first embodiment of a microparticle measuring apparatus 1 according to the present technology.

With reference to the drawings, hereinafter, a description will be given of preferred modes for carrying out the present technology. An embodiment to be described below is an example of a typical embodiment of the present technology, and the scope of the present technology is not interrupted narrowly by the following embodiment. Note that the description is given in the following order.

1. Microparticle Measuring Apparatus 1
(1) Flow Channel P
(2) Light Radiation Section 11
(3) Light Detection Section 12
(4) Detection Timing Control Section 13
(5) Flow-Rate Control Section 14
(6) Sorting Section 15
(7) Sorting Timing Control Section 16
(8) Analysis Section 17
(9) Storage Section 18
(10) Display Section 19
2. Microparticle Measuring Method <1. Microparticle Measuring Apparatus 1>

A microparticle measuring apparatus 1 according to the present technology includes at least a plurality of light detection sections 12 and a detection timing control section 13. Furthermore, if necessary, the microparticle measuring apparatus 1 can include a flow channel P, a light radiation section 11, a flow-rate control section 14, a sorting section 15, a sorting timing control section 16, an analysis section 17, a storage section 18, a display section 19, and the like. Hereinafter, the details of the respective sections will be described along with a time series of measurement.

Figure 2:
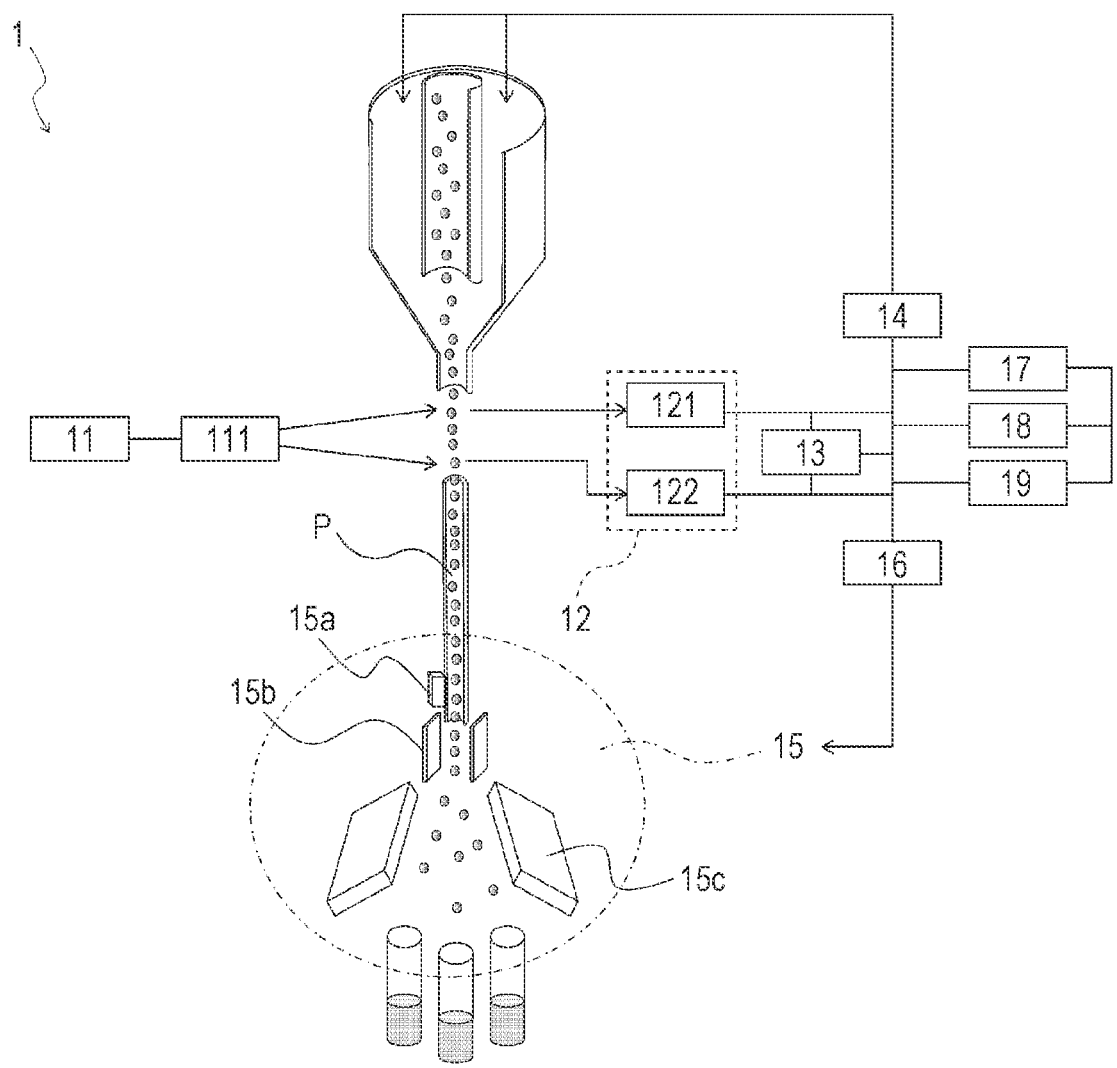
FIG. 2 is a schematic conceptual diagram schematically illustrating a second embodiment of the microparticle measuring apparatus 1 according to the present technology.
Figure 3:
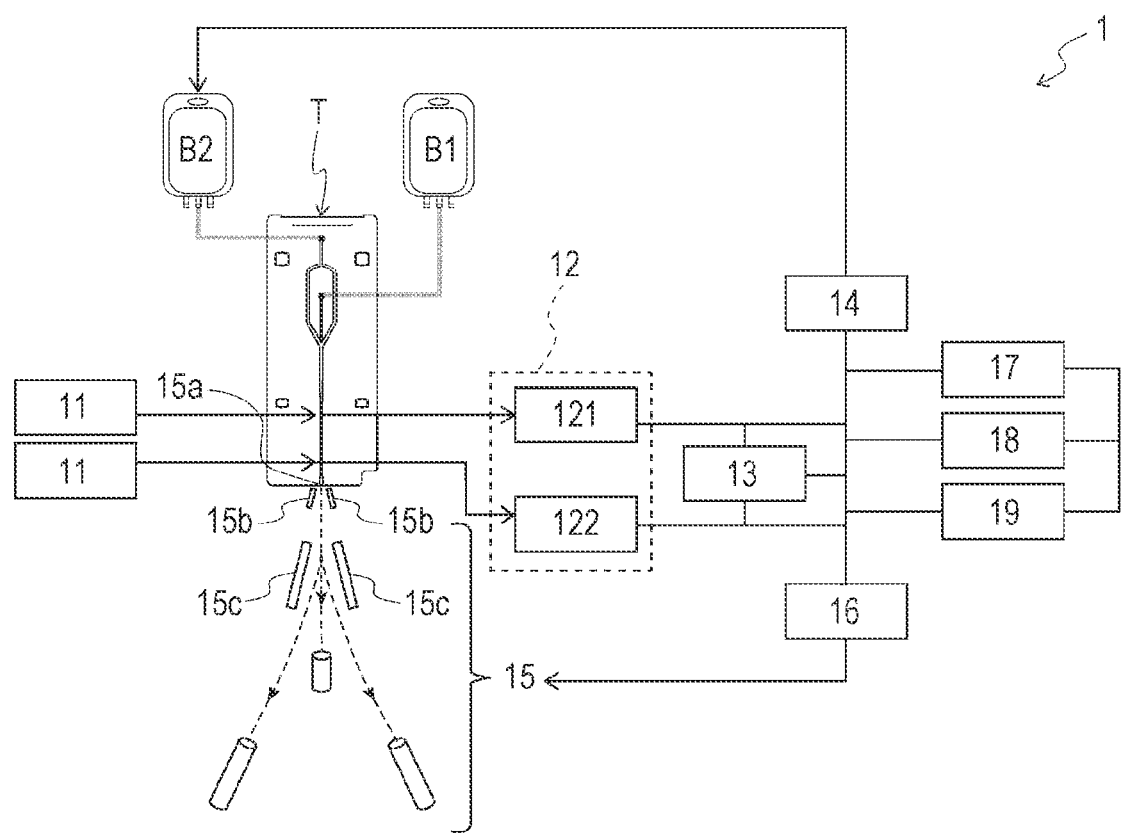
FIG. 3 is a schematic conceptual diagram schematically illustrating a third embodiment of the microparticle measuring apparatus 1 according to the present technology.
Figure 4:
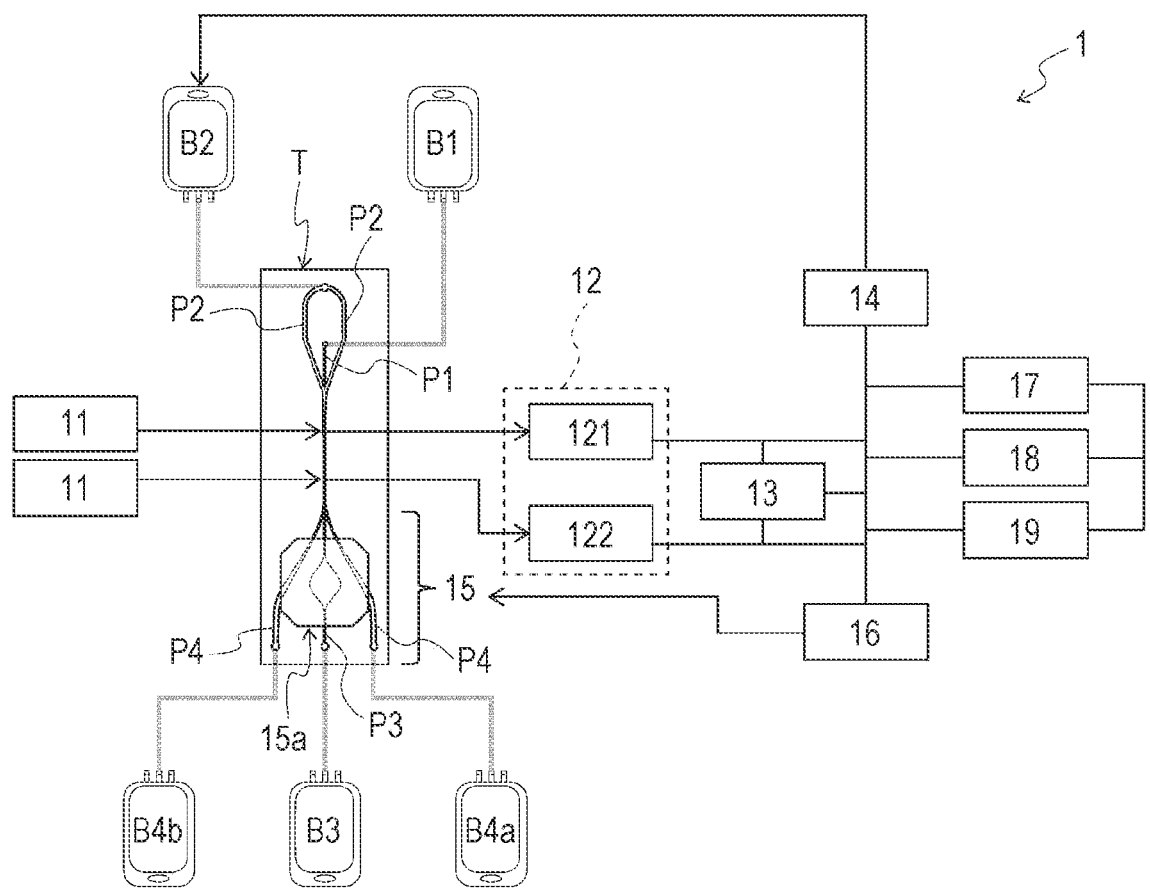
FIG. 4 is a schematic conceptual diagram schematically illustrating a fourth embodiment of the microparticle measuring apparatus 1 according to the present technology.

FIG. 1 is a schematic conceptual diagram schematically illustrating a first embodiment of the microparticle measuring apparatus 1 according to the present technology. FIG. 2 is a schematic conceptual diagram schematically illustrating a second embodiment of the microparticle measuring apparatus 1 according to the present technology. FIG. 3 is a schematic conceptual diagram schematically illustrating a third embodiment of the microparticle measuring apparatus 1 according to the present technology. FIG. 4 is a schematic conceptual diagram schematically illustrating a fourth embodiment of the microparticle measuring apparatus 1 according to the present technology.

(1) Flow Channel P

The microparticle measuring apparatus 1 according to the present technology is an apparatus configured to detect optical information emitted from microparticles flowing through a flow channel P. The flow channel P may be provided in the microparticle measuring apparatus 1 in advance. Alternatively, a commercially available flow channel P, a disposable chip provided with a flow channel P, or the like can also be used.

A form of the flow channel P is not particularly limited, and can be designed freely. For example, the flow channel P is not limited to a flow channel P formed in a two-dimensional or three-dimensional substrate T made of plastic, glass, or the like as described in the first, third, and fourth embodiments illustrated in FIGS. 1, 3, and 4. As described in the second embodiment illustrated in FIG. 2, a flow channel P used in a conventional flow site meter or the like can also be used in the microparticle measuring apparatus 1 according to the present technology.

Furthermore, a flow channel width, a flow channel depth, and a flow channel sectional shape of the flow channel P are not particularly limited as long as the flow channel P can form a laminar flow, and can be designed freely. For example, a micro-flow channel having a flow channel width of 1 mm or less can be used in the microparticle measuring apparatus 1 according to the present technology. In particular, a micro-flow channel having a flow channel width in a range from about 10 μm or more to about 1 mm or less can suitably be used in the microparticle measuring apparatus 1 according to the present technology.

The microparticles driven to flow through the flow channel P can be labeled with coloring matters such as one kind of fluorochrome, two or more kinds of fluorochromes, or the like. In this case, examples of the fluorochromes usable in the present technology may include Cascade Blue, Pacific Blue, Fluorescein isothiocyanate (FITC), Phycoerythrin (PE), Propidium iodide (PI), Texas red (TR), Peridinin chlorophyll protein (PerCP), Allophycocyanin (APC), 4',6-Diamidino-2-phenylindole (DAPI), Cy3, Cy5, Cy7, Brilliant Violet (BV421), and the like.

(2) Light Radiation Section 11

The microparticle measuring apparatus 1 according to the present technology can include the light radiation section 11. The light radiation section 11 radiates light to the microparticles flowing through the flow channel P. The microparticle measuring apparatus 1 according to the present technology does not necessarily include the light radiation section 11. An external light radiating apparatus or the like can be used for radiating light to the microparticles flowing through the flow channel P.

The kind of light to be radiated by the light radiation section 11 is not particularly limited. Light of which the traveling direction, wavelength, and intensity are fixed is desired in order to cause the microparticles to reliably emit fluorescent or scattered light. Examples thereof may include a laser, an LED, and the like. In the case of using a laser, the kind thereof is not particularly limited. One kind of or two or more kinds of an argon ion (Ar) laser, a helium-neon (He—Ne) laser, a dye laser, a krypton (Cr) laser, a semiconductor laser, a solid-state laser as a combination of a semiconductor laser with a wavelength conversion optical element, and the like can be used in free combination.

The microparticle measuring apparatus 1 according to the present technology is a microparticle measuring apparatus that adopts "multiple spots". Therefore, light radiation is carried out at a plurality of positions on the flow channel P. For that purpose, a plurality of the light radiation sections 11 may be provided as described in the first, third, and fourth embodiments illustrated in FIGS. 1, 3, and 4. As described in the second embodiment illustrated in FIG. 2, light radiation at a plurality of positions on the flow channel P can also be carried out in such a manner that light from the single light radiation section 11 is split through a light control section 111 such as a spectroscope.

(3) Light Detection Section 12

The light detection section 12 detects optical information emitted from the microparticles circulating through the flow channel P. The microparticle measuring apparatus 1 according to the present technology includes the plurality of light detection sections 12 that detect optical information emitted from the microparticles, at the plurality of positions on the flow channel P.

With regard to the light detection section 12 usable in the microparticle measuring apparatus 1 according to the present technology, the specific light detecting method is not particularly limited as long as the light detection section 12 can detect optical signals from the microparticles. The microparticle measuring apparatus 1 can freely select and adopt a light detecting method used in a publicly-known photodetector. For example, one kind of or two or more kinds of light detecting methods used in a fluorescent-light measuring instrument, a scattered-light measuring instrument, a transmitted-light measuring instrument, a reflected-light measuring instrument, a diffracted-light measuring instrument, an ultraviolet-light spectral measuring instrument, an infrared-light spectral measuring instrument, a Raman spectral measuring instrument, a FRET measuring instrument, a FISH measuring instrument, other various spectral measuring instruments, a PMT array or a photodiode array including light receiving elements, such as PMTs or photodiodes, arrayed one-dimensionally, an arrangement of a plurality of independent detection channels such as two-dimensional light receiving elements such as CCDs or CMOS sensors, and the like can be adopted in free combination.

Figure 5:
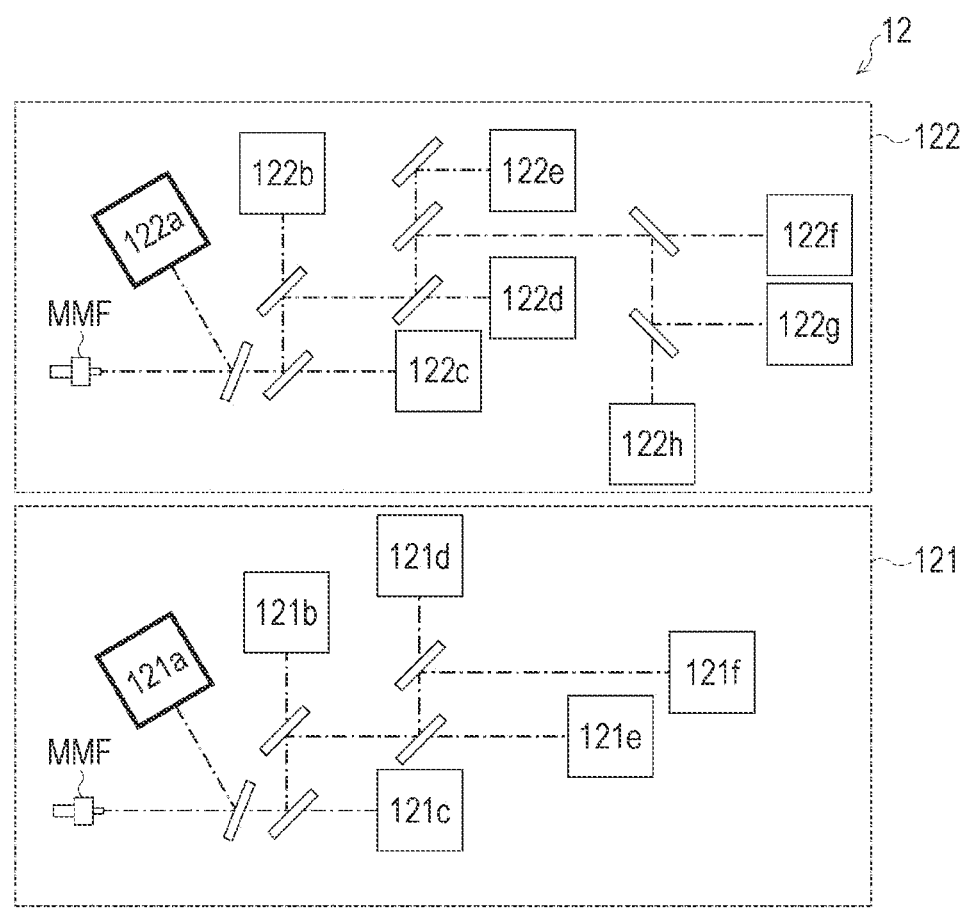
FIG. 5 is a schematic conceptual diagram schematically illustrating an example of a light detection section 12 usable in the microparticle measuring apparatus 1 according to the present technology.

That is, the microparticle measuring apparatus 1 according to the present technology may include the plurality of light detection sections 12, and each light detection section 12 may be provided with a plurality of light detection channels. FIG. 5 illustrates an example of the light detection section 12 configured with the plurality of light detection sections including the plurality of light detection channels. The light detection section 12 illustrated in FIG. 5 includes a light detection section 121 provided with six light detection channels 121a to 121f, and a light detection section 122 provided with eight light detection channels 122a to 122h.

In the light detection section 12 usable in the microparticle measuring apparatus 1 according to the present technology, each of the light detection sections 121 and 122 can be provided with any number of light detection channels 121a to 121f or 122a to 122h in accordance with a purpose, and the like, as in the respective light detection sections 121 and 122 of the light detection section 12 illustrated in FIG. 5.

Figure 6:
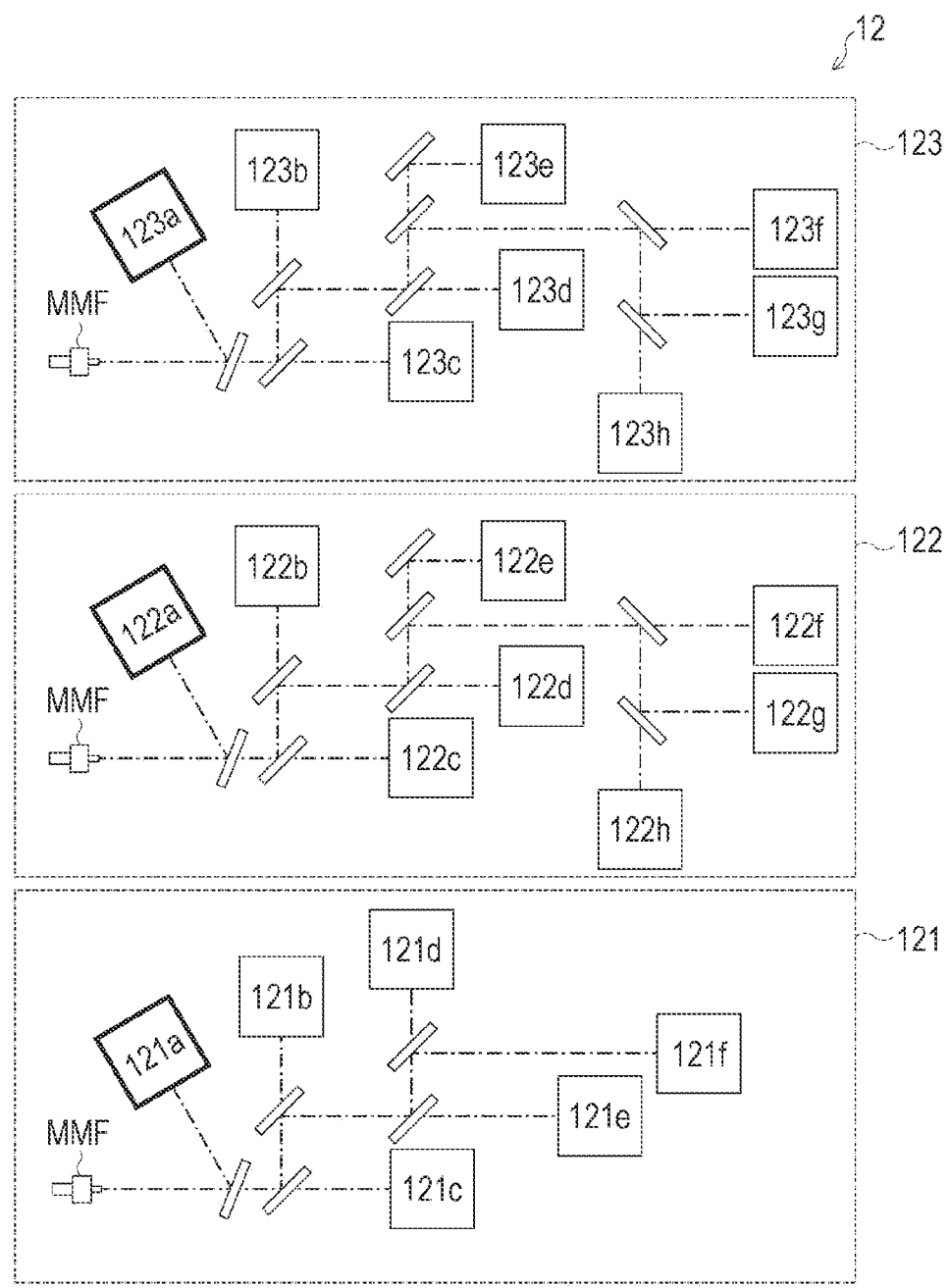
FIG. 6 is a schematic conceptual diagram schematically illustrating an example, which is different from that illustrated in FIG. 5, of the light detection section 12 usable in the microparticle measuring apparatus 1 according to the present technology.

Furthermore, the microparticle measuring apparatus 1 according to the present technology can also include a single third light detection section 123 or a plurality of third light detection sections 123 configured to detect optical information emitted from the microparticles, at a position or positions different from the positions of the first light detection section 121 and second light detection section 122. FIG. 6 is a schematic conceptual diagram schematically illustrating an example of the light detection section 12 including three light detection sections 121, 122, and 123 located at different positions on the flow channel P. As illustrated in FIG. 6, the third detection section 123 can also be provided with any number of light detection channels 123a to 123h, in accordance with a purpose and the like.

In the microparticle measuring apparatus 1 according to the present technology, the positions of the respective light detection sections 12 (121, 122, 123, . . . ) are not particularly limited. The light detection sections 12 may be arranged in any order from the upstream side of the flow channel P. For example, the first light detection section 121 may be arranged to be capable of detecting optical information emitted from the microparticles at a position upstream of the second light detection section 122, or may be arranged to be capable of detecting optical information emitted from the microparticles at a position downstream of the second light detection section 122.

In the microparticle measuring apparatus 1 according to the present technology, the position where the light detection section 12 is disposed is not particularly limited as long as the light detection section 12 can detect the optical signals from the microparticles, and can be designed freely. For example, as described in the first to fourth embodiments illustrated in FIGS. 1 to 4, preferably, the light detection section 12 is disposed opposite the light radiation section 11 across the flow channel P. The reason therefor is as follows. If the light detection section 12 is disposed opposite the light radiation section 11 across the flow channel P, the light radiation section 11 and the light detection section 12 can be disposed in a more free configuration. Furthermore, for example, since fluorescent light travels in a direction different from an incoming direction of radiated light, the light detection section 12 and the light radiation section 11 may be disposed on the same side with respect to the flow channel P, or the side on which the light detection section 12 is disposed may be shifted by 90 degrees from the side on which the light radiation section 11 is disposed, with respect to the flow channel P.

(4) Detection Timing Control Section 13

Figure 7:
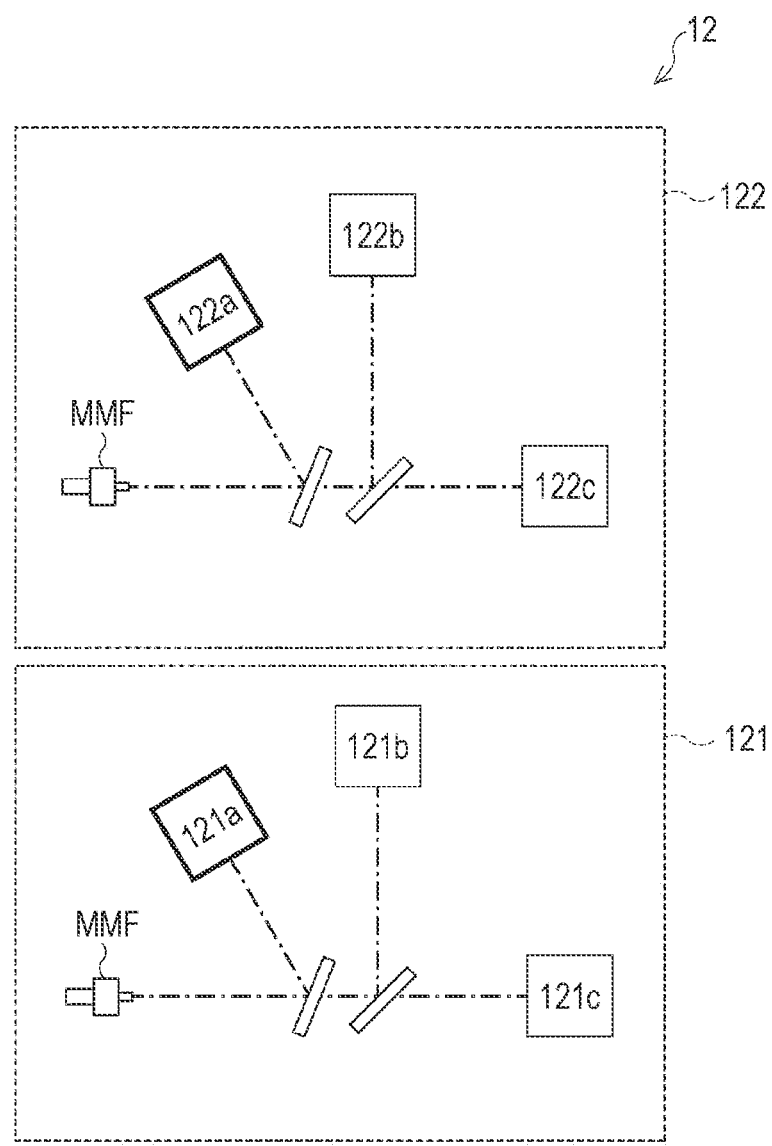
FIG. 7 is a schematic conceptual diagram schematically illustrating an example, which is different from those illustrated in FIGS. 5 and 6, of the light detection section 12 usable in the microparticle measuring apparatus 1 according to the present technology.
Figure 8:
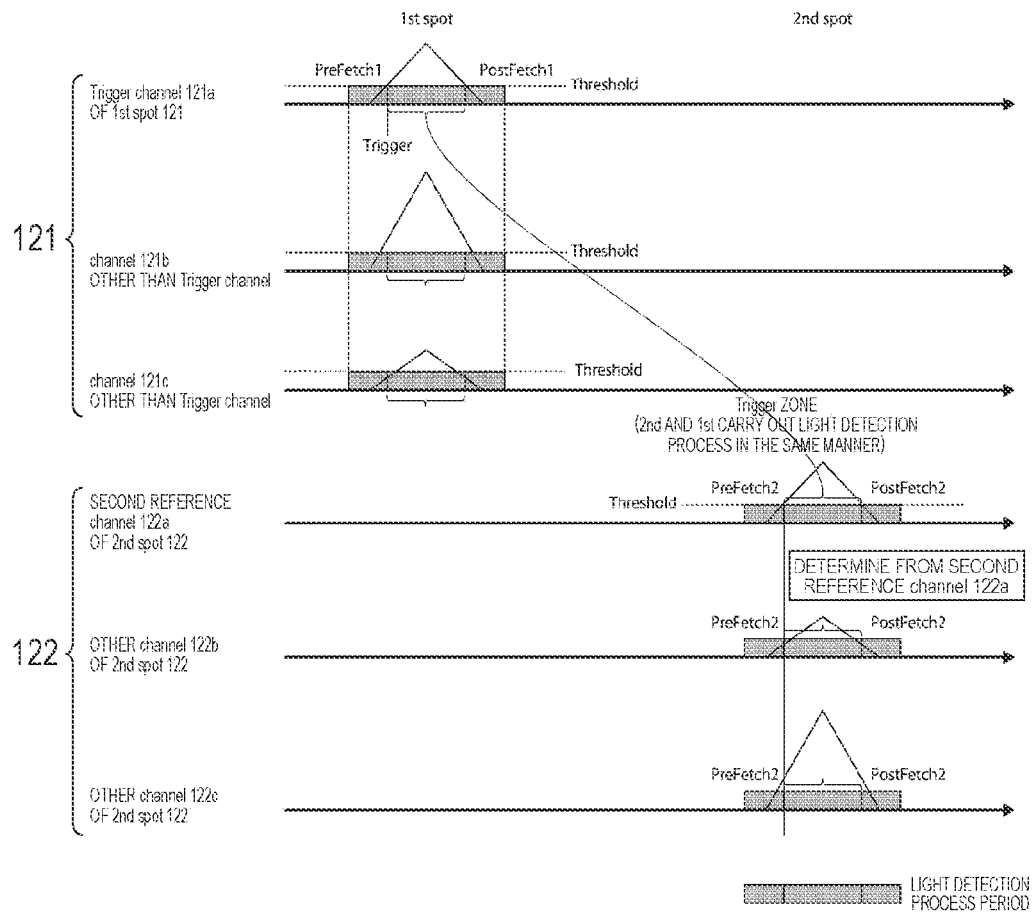
FIG. 8 is a conceptual diagram illustrating a light detection period in a case where a light detection process is carried out using the microparticle measuring apparatus 1 including the light detection section 12 illustrated in FIG. 7.

The detection timing control section 13 controls detection timing of the plurality of light detection sections 12. With reference to FIGS. 7 and 8, a description will be given of a specific detection timing method. FIG. 7 is a schematic conceptual diagram schematically illustrating an example of the light detection section 12 usable in the microparticle measuring apparatus 1 according to the present technology. The light detection section 12 illustrated in FIG. 7 includes a light detection section 121 provided with three light detection channels 121a, 121b, and 121c, and a light detection section 122 provided with three light detection channels 122a, 122b, and 122c. FIG. 8 is a conceptual diagram illustrating a light detection period in a case where a light detection process is carried out using the microparticle measuring apparatus 1 including the light detection section 12 illustrated in FIG. 7.

(a) Light Detection Process of First Light Detection Section 121

First, a given channel provided in any of the light detection sections 12 is determined as a trigger channel. Desirably, a channel in which almost all the particles emit light is selected as the trigger channel. Therefore, a channel for detecting fluorescent light may be used. Preferably, a channel for detecting one or more kinds of scattered light selected from frontward scattered light, sideward scattered light, and rearward scattered light is used. Herein, the trigger channel for detecting a trigger signal is a first reference channel 121a, and a light detection section provided with the first reference channel 121a is a first light detection section 121.

A threshold value is determined for the trigger channel (the first reference channel 121a). It is considered that the microparticles pass the trigger channel only in a case where a detected waveform exceeds the threshold value. Next, a timing and a period of carrying out a light detection process are determined for feature amounts (e.g., a height (H), an area (A), a width (W), and the like of a voltage signal into which an optical signal is converted) detected from the microparticles. The light detection process period can be made coincident with a period in which the waveform detected at the trigger channel (the first reference channel 121a) exceeds the threshold value. Preferably, a given time prior to this period and a given time subsequent to this period are added to this period (see "PreFetch1" and "Post-Fetch1" in FIG. 8). Adding, to the period in which the waveform exceeds the threshold value, given times prior to and subsequent to this period enables further improvement in detection accuracy. Furthermore, time definition such as abort (the process is stopped) can be made in a case where another microparticles come before or after the period. At this time, the same period of carrying out the light detection process is set for the other channels (121b, 121c) of the first light detection section. Irrespective of the sizes of the waveforms other than the waveform of the trigger channel (the first reference channel 121a), the period of carrying out the light detection process is set from only the waveform of the trigger channel.

(b) Light Detection Process of Second Light Detection Section 122

The second light detection section 122 detects optical information emitted from the microparticles, at a position different from the position of the first light detection section 121. Heretofore, the light detection timing by the second light detection section 122 has been controlled on the basis of a time (a laser delay time) determined at a timing such as a timing immediately after startup of an apparatus or a timing immediately after replacement of a chip including a flow channel, using as a starting point the trigger signal detected at the trigger channel (the first reference channel 121a) of the first light detection section 121. However, as described above, according to the conventional method using the laser delay time, detection accuracy is lowered during a measurement in some cases due to a difference in flow rate among the plurality of microparticles serving as the subject of detection.

Hence, in the present technology, on the basis of the optical signal detected at the second reference channel 122a provided in the second light detection section 122, the light detection timings and light detection periods of the other channels (122b, 122c) of the second light detection section 122 are controlled using as a starting point the trigger signal detected at the trigger channel (the first reference channel 121a) of the first light detection section 121, rather than the conventional laser delay time. The control described above enables real-time control of the light detection timing and light detection period of the second light detection section 122 even when the flow rate differs among the plurality of microparticles serving as the subject of detection, during the measurement. It is therefore possible to prevent degradation in detection accuracy and to maintain the detection accuracy at a high level.

Figure 9:
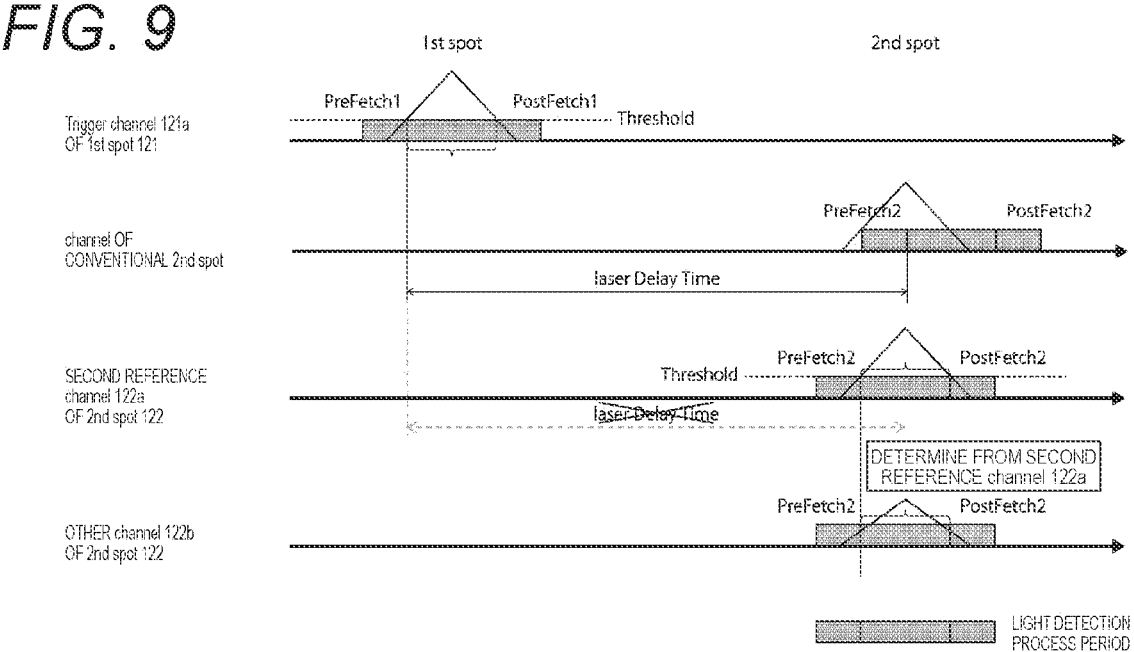
FIG. 9 is a conceptual diagram illustrating a light detection timing of a 2nd spot in a case where a flow rate of microparticles is high.
Figure 10:
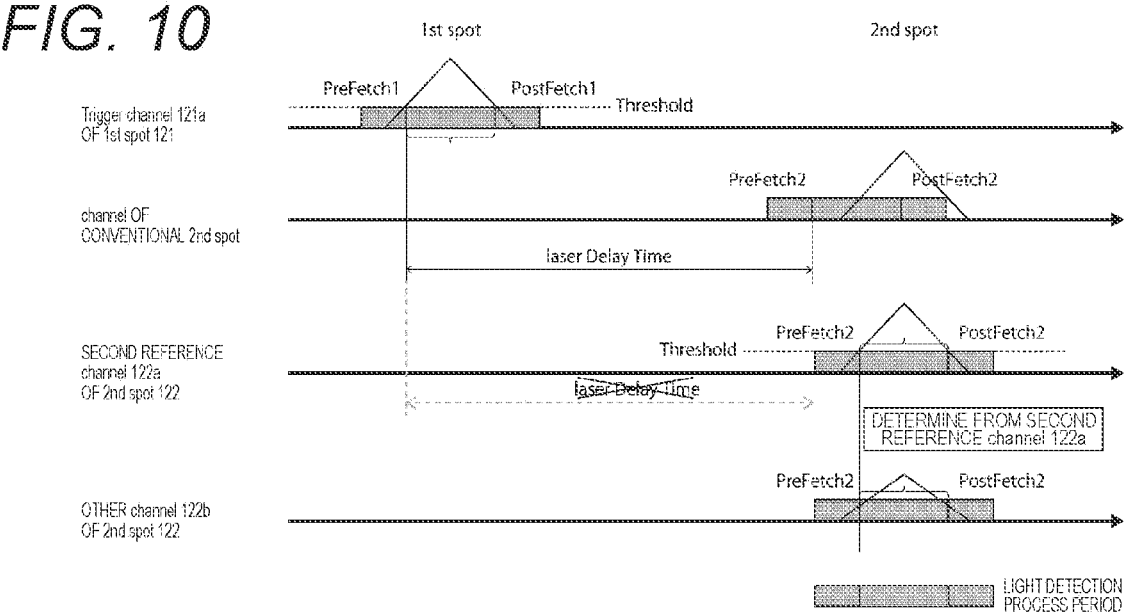
FIG. 10 is a conceptual diagram illustrating a light detection timing of the 2nd spot in a case where a flow rate of the microparticles is low.

As a specific example, FIG. 9 illustrates a light detection timing of the 2nd spot in a case where the flow rate of the microparticles is high, and FIG. 10 illustrates a light detection timing of the 2nd spot in a case where the flow rate of the microparticles is low. For a comparison with a conventional product, FIGS. 9 and 10 additionally illustrate a conventional light detection timing of the 2nd spot between the light detection timing of the 1nd spot and the light detection timing of the 2nd spot. As illustrated in FIGS. 9 and 10, according to the conventional method using the laser delay time, in the case where the flow rate of the microparticles is low or high, a delta wave obtained from the microparticles deviates from the detection timing, resulting in a problem that optical feature amounts to be detected by the 2nd spot become small. According to the present technology, however, since the laser delay time is not used, the light detection process can be carried out in accordance with a flow rate of microparticles serving as the subject of detection even in a case where the flow rate of the microparticles is high or low. As a result, it is possible to prevent degradation in detection accuracy and to maintain the detection accuracy at a high level.

In the case where the microparticle measuring apparatus 1 according to the present technology includes the single third light detection section 123 or the plurality of third light detection sections 123, the detection timing and light detection period of the third light detection section 123 can be controlled on the basis of the trigger signal detected at the first reference channel provided in the first light detection section and the optical signal detected at the second reference channel 122a provided in the second light detection section 122. Specifically, for example, the flow rate of the microparticles serving as the subject of detection is calculated on the basis of the trigger signal detected at the first reference channel provided in the first light detection section and the optical signal detected at the second reference channel 122a provided in the second light detection section 122, and the detection timing and light detection period of the third light detection section 123 can be controlled in accordance with the calculated flow rate.

Furthermore, the detection timing of the third light detection section can also be controlled on the basis of the trigger signal detected at the first reference channel provided in the first light detection section and an optical signal detected at a third reference channel 123a provided in the third detection section 123. Specifically, since this method is identical with the foregoing method of controlling the detection timing of the second light detection section 122, the description is omitted herein.

As described above, the detection timing and light detection period of the single third light detection section 123 or the plurality of third light detection sections 123 are performed on the basis of the optical signal detected at the third reference channel 123a provided in the third light detection section 123. Therefore, for example, the light detection can be performed at the optimum timing and period in which the microparticles serving as the target of a measurement pass the third light detection section 123 even in a case where the flow rate of the microparticles between the second light detection section and the third light detection section 123 is changed from the flow rate of the microparticles between the first light detection section 121 and the second light detection section 122.

Note that in the case where the plurality of third light detection sections 123 is provided (for example, "a fourth light detection section", "a fifth light detection section", "a sixth light detection section", are provided), all the third to sixth light detection sections may be provided with a reference channel or only any of the light detection sections may be provided with a reference channel. Specifically, in a case where the fourth to sixth light detection sections are provided with a reference channel alternately, for example, in a case where the fourth light detection section and the sixth light detection section are provided with reference channels (a fourth reference channel and a sixth reference channel), using as a starting point the trigger signal detected at the first reference channel provided in the first light detection section, the detection timings and light detection periods of the second light detection section and third light detection section 123 can be controlled on the basis of the optical signal detected at the second reference channel 122a provided in the second light detection section 122, the detection timings and light detection periods of the fourth light detection section and fifth light detection section can be controlled on the basis of the optical signal detected at the fourth reference channel provided in the fourth detection section, and the detection timing and light detection period of the sixth light detection section can be controlled on the basis of the optical signal detected at the fourth reference channel provided in the fourth detection section.

For example, in a case where there is a high possibility that the flow rate of the microparticles varies at the upstream side and the downstream side due to the shape, such as the length, of the flow channel P, in a case where the laminar flow becomes unstable due to the kind of microparticles in a sample to be used, and the like, providing reference channels in all the detection sections enables a measurement with higher accuracy.

Figure 11:
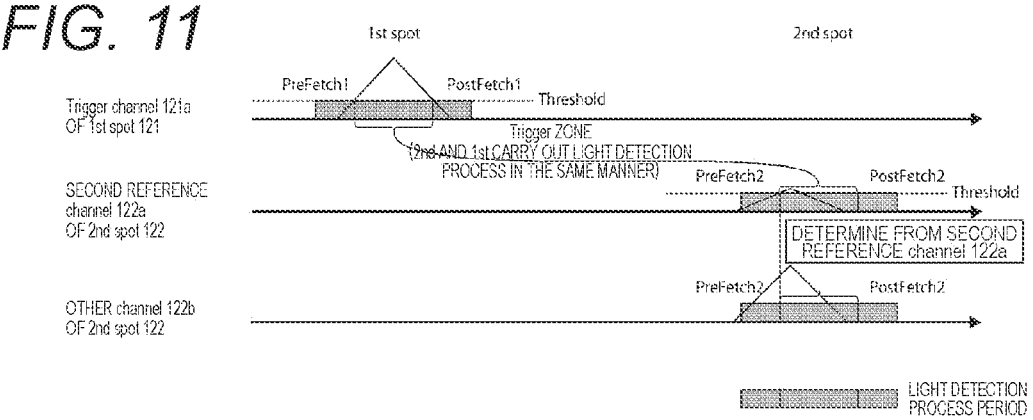
FIG. 11 is a conceptual diagram illustrating a light detection timing in a case where an optical signal detected at a second reference channel is extremely smaller than a trigger signal detected at a first reference channel.
Figure 12:
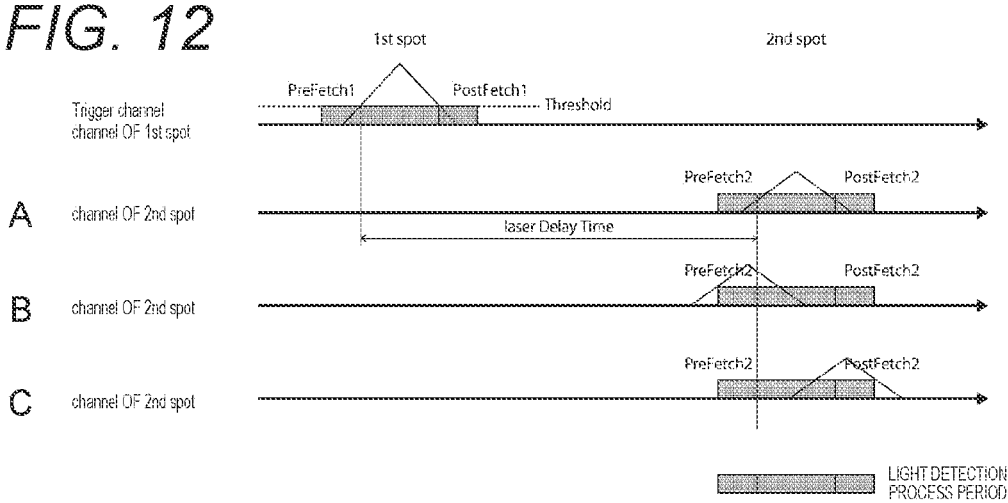
FIG. 12 is a conceptual diagram that illustrates a period in which a light detection process in a multi-color analysis method using multiple spots is carried out.

Preferably, the optical signals detected at the respective reference channels are optically equal to one another. The reason therefor is described with reference to FIG. 11. FIG. 11 is a conceptual diagram illustrating a light detection timing in a case where an optical signal detected at a second reference channel is extremely smaller than a trigger signal detected at a first reference channel. The light detection timing of the second light detection section 122 is controlled in accordance with the timing at which the optical signal at the second reference channel 122a exceeds the threshold value. Therefore, for example, as illustrated in the conceptual diagram of FIG. 11, in a case where the trigger signal detected at the first reference channel is largely different from the optical signal detected at the second reference channel 122a in an optical aspect (in a case where the optical signal at the second reference channel is extremely smaller), the timing at which the optical signal at the second reference channel 122a exceeds the threshold value is delayed and, in accordance with this, the detection timing of the other channel 122b of the second light detection section 122 is delayed to deviate from an optimum timing in some cases. Hence, when the optical signals detected at the respective reference channels are made optically equal to one another, the timings at which the optical signals detected at the respective reference channels exceed the threshold value become equal to one another. It is therefore possible to prevent deviation of detection timings subsequent to the second light detection section 121. As a result, it is possible to prevent degradation in detection accuracy and to maintain the detection accuracy at a high level. Note that FIG. 11 illustrates the case where the optical signal to be detected at the second reference channel is extremely smaller than the trigger signal to be detected at the first reference channel, for ease of the understanding. However, the detection timings at the respective detection sections do not largely deviate from one another as long as there is no large difference among the optical signals detected at the respective reference channels as described in this example. Therefore, the optical signals detected at the respective reference channels are not necessarily equal to one another in the optical aspect.

As a specific example being optically equal, for example, the optical signals to be detected at the respective reference channels can be made identical in height (H), area (A), and width (W) with voltage signals into which the optical signals detected at the respective reference channels are converted.

Desirably, a channel in which almost all the particles emit light is selected as each reference channel. Therefore, a channel for detecting fluorescent light may be used. Preferably, a channel for detecting one or more kinds of scattered light selected from frontward scattered light, sideward scattered light, and rearward scattered light is used.

(5) Flow-Rate Control Section 14

In the microparticle measuring apparatus 1 according to the present technology, as described above, each light detection section can be provided with a reference channel. Therefore, the flow rate of the microparticles can be calculated on the basis of an optical signal detected at each reference channel. Hence, using this, the flow-rate control section 14 that controls the flow rate of the microparticles can be provided.

For example, if the flow-rate control section 14 can control the flow rate of the microparticles on the basis of the trigger signal detected at the first reference channel 121a and the optical signal detected at the second reference channel 122a such that the microparticles pass between the first light detection section 121 and the second light detection section 122 for a fixed time, the light detection can be performed in the more optimum timing and period. As a result, it is possible to achieve a measurement with higher accuracy.

Furthermore, for example, in the case where the third light detection section 123 is provided as illustrated in FIG. 6, if the flow-rate control section 14 can control the flow rate of the microparticles on the basis of the trigger signal detected at the first reference channel 121a and the optical signal detected at the second reference channel 122a, the detection timing can be controlled on the basis of the flow rate of the microparticles or can be controlled using the conventional laser delay time even if the third light detection section 123 is not provided with the third reference channel 123a.

Note that in the conventional art, there is a technology for adjusting a timing by optimally changing a flow rate in a case where a laser delay time is not optimum. However, in such a microparticle measuring apparatus, it is necessary to use calibration beads or the like in order to reset at an optimum flow rate. It is therefore necessary to stop a measurement once even in a case where the measurement has started. On the other hand, using each reference channel provided in each light measurement section 12 as described in the present technology, it is possible to determine whether a current flow rate is higher or lower than a target, from the microparticles during a measurement. If feedback control is made using this, it is possible to achieve the microparticle measuring apparatus 1 obtaining an optimum flow rate without stopping a measurement once, unlike the conventional art.

A specific method of controlling the flow rate of the microparticles is not particularly limited, and a publicly-known method can be adopted freely. For example, the flow rate of the microparticles can be controlled by controlling a liquid sheath feeding pressure.

(6) Sorting Section 15

The microparticle measuring apparatus 1 according to the present technology can include the sorting section 15 configured to sort the microparticles, as described in the second to fourth embodiments illustrated in FIGS. 2 to 4. The sorting section 15 sorts the microparticles on the basis of data analyzed by the analysis section 17 to be described later, from the value detected by the light detection section 12. For example, the sorting section 15 can sort the microparticles at a position downstream of the flow channel P, on the basis of results of an analysis, such as the sizes, forms, internal structures, and the like of the microparticles derived from analysis data.

More specifically, as described in the second and third embodiments illustrated in FIGS. 2 and 3, for example, a vibrating element 15a that vibrates at a predetermined number of vibrations, or the like is used to apply vibration to the entire flow channel P or a part of the flow channel P, so that droplets are generated from an outlet of the flow channel P. Note that in this case, the vibrating element 15a to be used is not particularly limited, and a publicly-known vibrating element can be freely selected and used. Examples thereof may include a piezo vibrating element and the like. Furthermore, adjusting an amount of a liquid to be fed to the flow channel P, a diameter of the outlet, the number of vibrations of the vibrating element, and the like enables an adjustment of the size of droplets. It is thus possible to generate droplets each containing a certain amount of microparticles.

Next, positive or negative electric charges are charged on the basis of the results of an analysis, such as the sizes, forms, internal structures, and the like of the microparticles, analyzed on the basis of the data analyzed by the analysis section 17 (see reference sign 15b in FIGS. 2 and 3). Then, counter electrodes 15c to which a voltage is applied change the course of the charged droplets to a desired direction to sort the droplets.

Furthermore, as described in the fourth embodiment illustrated in FIG. 4, three branch flow channels, that is a sorting flow channel P3 and two discarding flow channels P4, are provided downstream of the flow channel P formed on the substrate T. The microparticles can be sorted in such a manner that the microparticles serving as the target of sorting and determined that predetermined optical characteristics are satisfied are taken in the sorting flow channel P3, the microparticles not serving as the target of sorting and determined that the predetermined optical characteristics are not satisfied are caused to flow into one of the two discarding flow channels P4 without being taken in the sorting flow channel P3.

The microparticles serving as the target of sorting can be taken in the sorting flow channel P3 by a publicly-known method. For example, negative pressure is generated in the sorting flow channel P3 by the vibrating element 15a such as a piezo element, and the liquid sample and liquid sheath containing the microparticles serving as the target of sorting are sucked into the sorting flow channel P3 by using this negative pressure. Furthermore, although not illustrated in the drawings, the microparticles serving as the target of sorting can also be taken in the sorting flow channel P3 in such a manner that a laminar flow direction is controlled or changed using a valve electromagnetic force, a fluid stream (a gas or a liquid), or the like.

In the fourth embodiment, as illustrated in the schematic conceptual diagram of FIG. 4, a fully closed-type sorting apparatus can be achieved in such a manner that a liquid sample reservoir section B1 communicates with and connects to the liquid sample flow channel P1, a liquid sheath reservoir section B2 communicates with and connects to the liquid sheath flow channel P2, a sorted liquid reservoir section B3 communicates with and connects to the sorting flow channel P3, and a waste liquid reservoir section B4 communicates with and connects to the discarding flow channel P4. For example, in a case where the microparticles serving as the target of sorting are cells and the like for use in cellular therapy and the like, preferably, the sorting apparatus is designed to be a fully closed type (isolated from an external environment) as described in the fourth embodiment in order to maintain a sterilized environment and to prevent contamination.

(7) Sorting Timing Control Section 16

In the microparticle measuring apparatus 1 according to the present technology, as described above, each light detection section can be provided with a reference channel. Therefore, the flow rate of the microparticles can be calculated on the basis of an optical signal detected at each reference channel. Hence, using this, the sorting timing control section 16 that controls a microparticle sorting timing can be provided.

In the microparticle measuring apparatus 1 according to the present technology, even when the flow rate differs among the plurality of microparticles serving as the subject of detection, the flow rate of the microparticles can be calculated in real time. Therefore, the sorting timing can also be controlled in real time.

(8) Analysis Section 17

The microparticle measuring apparatus 1 according to the present technology may further include the analysis section 17 if necessary. The analysis section 17 is connected to the light detection section 12, and analyzes optical information detected from the microparticles by the light detection section 12.

The analysis section 17 calculates the feature amounts of each microparticle from, for example, optical information of light received from the light detection section 12. Specifically, the feature amounts indicating the sizes, forms, internal structures, and the like of the microparticles are calculated from detected values of received fluorescent or scattered light.

Note that the microparticle measuring apparatus 1 according to the present technology does not necessarily include the analysis section 17. A state and the like of the microparticles can also be analyzed on the basis of optical information detected by the light detection section 12, using an external analysis apparatus or the like. For example, the analysis section 17 may be implemented by a personal computer or a CPU. The analysis section 17 can be stored as a program in a hardware resource including recording media (e.g., a nonvolatile memory (a USB memory), a HDD, a CD, and the like) and the like, and can be operated by the personal computer or the CPU. Furthermore, the analysis section 17 may be connected to the respective sections in the microparticle measuring apparatus 1 via a network.

(9) Storage Section 18

The microparticle measuring apparatus 1 according to the present technology can include the storage section 18 configured to store various kinds of information. The storage section 18 can store all items concerning a measurement, such as the value detected by each light detection section 12, control data in each control section, and analysis data generated at the analysis section 17.

In the microparticle measuring apparatus 1 according to the present technology, the storage section 18 is not essential, and an external storage apparatus may be connected. For example, a hard disk or the like can be used as the storage section 18.

(10) Display Section 19

The microparticle measuring apparatus 1 according to the present technology can include the display section 19 configured to display various kinds of information. The display section 19 can display all items concerning a measurement, such as the value detected by each light detection section 12, control data in each control section, and analysis data generated at the analysis section 17.

In the microparticle measuring apparatus 1 according to the present technology, the display section 19 is not essential, and an external display apparatus may be connected. For example, a display, a printer, or the like can be used as the display section 19.

<2. Microparticle Measuring Method>

The microparticle measuring method according to the present technology is a method that carries out at least a light detection step of detecting, at a plurality of positions, optical information emitted from the microparticles flowing through the flow channel P, and a detection timing control step. Furthermore, the microparticle measuring method according to the present technology can carry out, if necessary, a light radiation step, a flow-rate control step, a sorting step, a sorting timing control step, an analysis step, a storage step, a display step, and the like. Note that the details of the respective steps are identical with the methods carried out by the light detection section 12, detection timing control section 13, light radiation section 11, flow-rate control section 14, sorting section 15, sorting timing control section 16, analysis section 17, storage section 18, and display section 19 in the microparticle measuring apparatus 1 described above. Therefore, the description is omitted Note that the present technology can adopt the following configurations.

(1)

A microparticle measuring apparatus including:

a plurality of light detection sections configured to detect, at different positions, optical information emitted from microparticles flowing through a flow channel; and a detection timing control section configured to control a detection timing of each light detection section, on the basis of a trigger signal detected at a first reference channel provided in a first light detection section, and an optical signal detected at a second reference channel provided in a second light detection section that detects optical information emitted from the microparticles, at a position different from a position of the first light detection section.

(2)

The microparticle measuring apparatus as recited in (1), in which the detection timing control section controls the detection timing of each light detection section in real time. (3)

The microparticle measuring apparatus as recited in (1) or (2), in which the detection timing control section controls a detection process period of the second light detection section.

(4)

The microparticle measuring apparatus as recited in (3), in which the detection timing control section controls the detection process period of the second light detection section in real time.

(5)

The microparticle measuring apparatus as recited in any of (1) to (4), in which the trigger signal detected at the first reference channel is optically equal to the optical signal detected at the second reference channel.

(6)

The microparticle measuring apparatus as recited in (5), in which a voltage signal into which the trigger signal detected at the first reference channel is converted is identical in height (H), area (A), and width (W) with a voltage signal into which the optical signal detected at the second reference channel is converted.

(7)

The microparticle measuring apparatus as recited in any of (1) to (6), including:

a flow-rate control section configured to control a flow rate of the microparticles on the basis of the trigger signal detected at the first reference channel and the optical signal detected at the second reference channel.

(8)

The microparticle measuring apparatus as recited in (7), in which the flow-rate control section controls the flow rate of the microparticles such that the microparticles pass between the first light detection section and the second light detection section for a fixed time.

(9)

The microparticle measuring apparatus as recited in (7) or (8), in which the flow-rate control section controls the flow rate of the microparticles by controlling a liquid sheath feeding pressure.

(10)

The microparticle measuring apparatus as recited in any of (1) to (9), including:

a sorting section configured to sort the microparticles on the basis of the optical information detected by the plurality of light detection sections.

(11)

The microparticle measuring apparatus as recited in (10), including:

a sorting timing control section configured to control a sorting timing of the sorting section, on the basis of the trigger signal detected at the first reference channel and the optical signal detected at the second reference channel.

(12)

The microparticle measuring apparatus as recited in (11), in which the sorting timing control section controls the sorting timing of the sorting section in real time.

(13)

The microparticle measuring apparatus as recited in any of (1) to (12), in which the first reference channel and the second reference channel detect scattered light from the microparticles.

(14)

The microparticle measuring apparatus as recited in (13), in which the scattered light includes one or more kinds of scattered light selected from frontward scattered light, sideward scattered light, and rearward scattered light.

(15)

The microparticle measuring apparatus as recited in any of (1) to (14), including:

a single third light detection section or a plurality of third light detection sections configured to detect optical information emitted from the microparticles, at a position or positions different from the positions of the first light detection section and second light detection section.

(16)

The microparticle measuring apparatus as recited in (15), in which the detection timing control section controls a detection timing of each light detection section, on the basis of the trigger signal detected at the first reference channel, the optical signal detected at the second reference channel, and an optical signal detected at a third reference channel provided in the or each third light detection section.

(17)

The microparticle measuring apparatus as recited in any of (1) to (16), in which the first light detection section detects the optical information emitted from the microparticles, at a position upstream of the second light detection section.

(18)

The microparticle measuring apparatus as recited in any of (1) to (17), in which the first light detection section detects the optical information emitted from the microparticles, at a position downstream of the second light detection section.

(19)

A microparticle measuring method including:

a light detection step of detecting, at a plurality of positions, optical information emitted from microparticles flowing through a flow channel; and a detection timing control step of controlling, on the basis of a trigger signal detected at a first reference channel provided in a first light detection section and an optical signal detected at a second reference channel provided in a second light detection section that detects optical information emitted from the microparticles, at a position different from a position of the first light detection section, a detection timing of each light detection section.

REFERENCE SIGNS LIST

1 Microparticle measuring apparatus
P Flow channel
11 Light radiation section
12 Light detection section
13 Detection timing control section
14 Flow-rate control section
15 Sorting section
16 Sorting timing control section
17 Analysis section
18 Storage section
19 Display section

The invention claimed is:

1. A microparticle measuring apparatus, comprising:
a liquid sample reservoir connected to a liquid sample flow channel, wherein the liquid sample reservoir is configured to store a liquid sample including microparticles;
a liquid sheath reservoir connected to a liquid sheath flow channel, wherein the liquid sample flow channel and the liquid sheath flow channel are connected to a flow channel;
a sorted liquid reservoir connected to a sorting flow channel;
a waste liquid reservoir connected to a discarding flow channel, wherein the sorting flow channel and the discarding flow channel are connected to the flow channel;
a plurality of light detectors configured to detect, at different positions, optical information emitted from the microparticles that flow through the flow channel, wherein the plurality of light detectors includes:
a first light detector that includes a first plurality of channels, and
a second light detector that includes a second plurality of channels,
the first light detector including the first plurality of channels is at a first position on the flow channel, and
the second light detector including the second plurality of channels is at a second position on the flow channel different from the first position; and
circuitry configured to:
control a detection timing of each light detector of the plurality of light detectors based on:
a trigger signal detected at a first reference channel of the first plurality of channels of the first light detector, and
an optical signal detected at a second reference channel of the second plurality of channels of the second light detector;
set a light detection process period of the first reference channel of the first plurality of channels of the first light detector based on a time period in which the trigger signal detected at the first reference channel exceeds a threshold value;
add a first time period and a second time period to the set light detection process period, wherein
the first time period is added prior to the set light detection process period, and
the second time period is added subsequent to the set light detection process period; and control a detection process period of the second light detector based on the set light detection process period of the first reference channel that includes the first time period and the second time period.

2. The microparticle measuring apparatus according to claim 1, wherein the circuitry is further configured to control the detection timing of each light detector of the plurality of light detectors in real time.

3. The microparticle measuring apparatus according to claim 1, wherein the circuitry is further configured to control the detection process period of the second light detector in real time.

4. The microparticle measuring apparatus according to claim 1, wherein the trigger signal detected at the first reference channel is optically equal to the optical signal detected at the second reference channel.

5. The microparticle measuring apparatus according to claim 4, wherein a voltage signal into which the trigger signal detected at the first reference channel is converted is identical in height (H), area (A), and width (W) with a voltage signal into which the optical signal detected at the second reference channel is converted.

6. The microparticle measuring apparatus according to claim 1, further comprising a flow-rate controller configured to control a flow rate of the microparticles based on the trigger signal detected at the first reference channel and the optical signal detected at the second reference channel.

7. The microparticle measuring apparatus according to claim 6, wherein the flow-rate controller is further configured to control the flow rate of the microparticles such that the microparticles pass between the first light detector and the second light detector for a fixed time.

8. The microparticle measuring apparatus according to claim 6, wherein the flow-rate controller is further configured to control the flow rate of the microparticles by control of a liquid sheath feeding pressure.

9. The microparticle measuring apparatus according to claim 1, further comprising a plurality of counter electrodes configured to sort the microparticles based on the detected optical information.

10. The microparticle measuring apparatus according to claim 9, wherein the circuitry is further configured to control a sorting timing of the plurality of counter electrodes, based on the trigger signal detected at the first reference channel and the optical signal detected at the second reference channel.

11. The microparticle measuring apparatus according to claim 10, wherein the circuitry is further configured to control the sorting timing of the plurality of counter electrodes in real time.

12. The microparticle measuring apparatus according to claim 1, wherein the first reference channel and the second reference channel are configured to detect scattered light from the microparticles.

13. The microparticle measuring apparatus according to claim 12, wherein the scattered light comprises at least one of frontward scattered light, sideward scattered light, or rearward scattered light.

14. The microparticle measuring apparatus according to claim 1, wherein the circuitry is further configured to control the detection timing of each light detector of the plurality of light detectors, based on the trigger signal detected at the first reference channel, the optical signal detected at the second reference channel, and an optical signal detected at a third reference channel in a third light detector of the plurality of light detectors.

15. The microparticle measuring apparatus according to claim 1, wherein the first light detector is configured to detect the optical information emitted from the microparticles, at a position upstream of the second light detector.

16. The microparticle measuring apparatus according to claim 1, wherein the first light detector is configured to detect the optical information emitted from the microparticles, at a position downstream of the second light detector.

17. A microparticle measuring method, comprising:
in a microparticle measuring apparatus that includes a plurality of light detectors, a liquid sample reservoir connected to a liquid sample flow channel, a liquid sheath reservoir connected to a liquid sheath flow channel, a sorted liquid reservoir connected to a sorting flow channel, and a waste liquid reservoir connected to a discarding flow channel:
detecting, by the plurality of light detectors, at different positions, optical information emitted from microparticles flowing through a flow channel, wherein
the liquid sample flow channel, the liquid sheath flow channel, the sorting flow channel, and the discarding flow channel are connected to the flow channel,
the liquid sample reservoir is configured to store a liquid sample that includes the microparticles,
the plurality of light detectors includes:
a first light detector that includes a first plurality of channels, and
a second light detector that includes a second plurality of channels, the first light detector including the first plurality of channels is at a first position on the flow channel, and
the second light detector including the second plurality of channels is at a second position on the flow channel different from the first position; and
controlling a detection timing of each light detector of the plurality of light detectors based on:
a trigger signal detected at a first reference channel of the first plurality of channels of the first light detector, and
an optical signal detected at a second reference channel of the second plurality of channels of the second light detector;
setting a light detection process period of the first reference channel of the first plurality of channels of the first light detector based on a time period in which the trigger signal detected at the first reference channel exceeds a threshold value;
adding a first time period and a second time period to the set light detection process period, wherein
the first time period is added prior to the set light detection process period, and
the second time period is added subsequent to the set light detection process period; and
controlling a detection process period of the second light detector based on the set light detection process period of the first reference channel that includes the first time period and the second time period.

* * * * *